Patented July 18, 1950

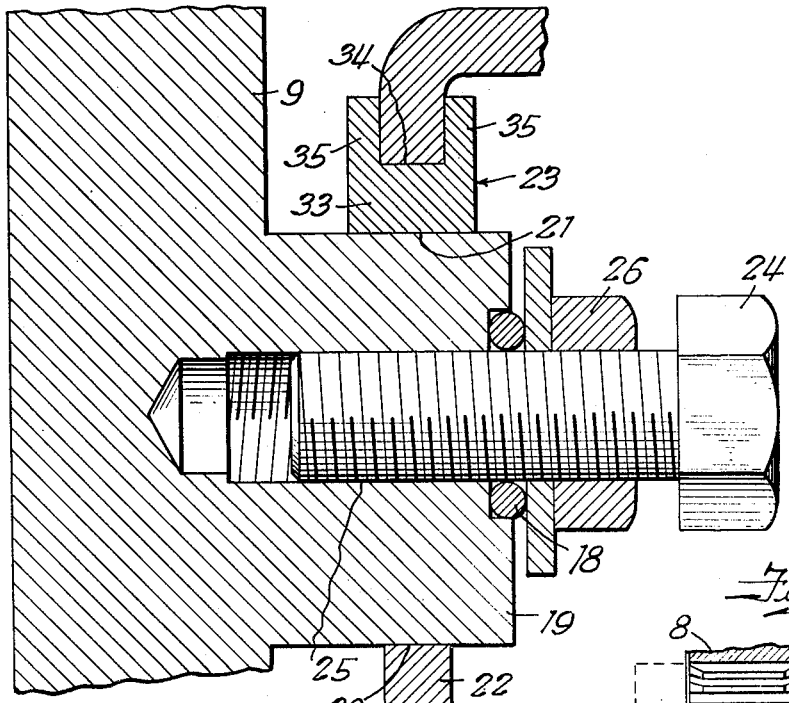
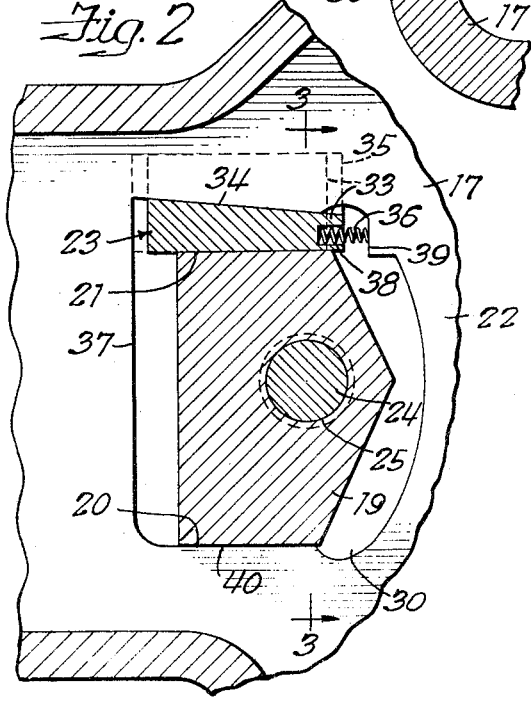

2,515,277

UNITED STATES PATENT OFFICE 2,515,277

AXIALLY ENGAGING OPPOSED CLUTCH

W. Vincent Thelander and Everson M. De Coursey, Auburn, Ind., assignors, by direct and mesne assignments, to Dana Corporation, Toledo, Ohio, a corporation of Virginia Application August 17, 1945, Serial No. 611,040

24 Claims. (Cl. 192—68)

This invention relates to friction clutches for use on automobiles, tractors, and other vehicles, and suitable also for industrial applications.

The principal object of our invention is to provide simple and improved anti-rattle means for use in connection with the drive lugs on the pressure plate where these lugs project through openings in the back plate, whereby to eliminate the hammer noise otherwise produced in the operation of the clutch as a result of the operating clearance necessarily provided for the drive lugs in the openings in the back plate.

According to the present invention, small wedge-shaped blocks, suitably mounted on the back plate in the drive lug openings and arranged to have abutment with the drive lugs on the "coast" side, are normally urged inwardly with respect to the axis of rotation of the clutch by suitable spring means, whereby to afford ample working clearance for the drive lugs in said openings only while these flying wedges are in retracted position, the clearance, however, being taken up automatically when the flywheel attains a predetermined R. P. M., at which the flying wedges move outwardly under centrifugal force against the action of the spring means and take up all clearance.

The invention is illustrated in the accompanying drawing, in which:

Fig. 1 is a section through a friction clutch embodying our invention;

Fig. 2 is an enlarged sectional detail taken on the line 2—2 of Fig. 1, showing the relationship of the flying wedge of our invention to one of the drive lugs on the pressure plate, and Fig. 3 is a still further enlarged sectional detail on the line 3—3 of Figs. 1 and 2.

The same reference numerals are applied to corresponding parts throughout the views.

Referring first to Fig. 1, the reference numeral 4 is applied to a flywheel mounted on the rear end of the usual engine crankshaft and forming the driving element, the shaft 5 constituting the driven element and extending rearwardly from the clutch into the gear box of the transmission in the usual way. Indicated at 6 is a portion of the clutch throw-out bearing movable in the usual way by means of the clutch pedal or lever (not shown). The clutch illustrated is like that disclosed in Thelander Patent 2,214,780, issued September 17, 1940, but it should be understood that the present invention is not limited to use on that particular clutch but may be used on any friction clutch where a similar problem of providing anti-rattle means is presented; that is to say, in any friction clutch wherein the pressure plate has drive lugs slidably engaged in openings in the back plate or back plate segments, bearing in mind that in the earlier Thelander et al. Patent 1,985,301, issued December 25, 1934, the conventional back plate was eliminated in one form and a number of separate brackets fastened to the flywheel were substituted, forming what we have called a lever support. The clutch herein shown comprises a disk 7, carried on a hub 8, splined on the front end of the shaft 5, and a pressure plate 9 disposed behind and in concentric relation to the matted portion 10 of the disk 7 to cause engagement thereof with the flat back face 11 on the flywheel. In accordance with the Thelander et al. Patent 1,985,301, a plurality of release levers 12 are provided, which are arranged to be depressed against the action of compression springs 13 by clutch pedal operation of the throw-out bearing 6 against the inner ends 14 of the levers to disengage the clutch. These levers are pivoted on cross-pins 15 near their outer ends 16 to transmit pressure of the springs 13 in a multiplied degree to the pressure plate 9. Although the pressure of the springs is multiplied through the levers 12 for clutch engagement, there is an appreciable mechanical advantage in the disengagement of the clutch by reason of the fact that the springs 13 are closer to the pivots 15 than the inner ends 14 of the levers where the throw-out bearing 6 engages, thus making for lighter pedal action. The arrangement also is of advantage from the standpoint that there is very little loss of spring pressure when the clutch facings or mats 10 become worn, because there is so little expansion permitted of the springs in proportion to a given amount of wear of the facings. When the levers 12 are depressed and the springs 13 are accordingly compressed between the levers 12 and the back plate or spider 17, the pressure plate 9, in accordance with the disclosure in Thelander Patent 2,214,780, is arranged to be backed away from the flywheel 4 by hairpin type springs 18 acting between the back plate 17 and drive lugs 19 on the pressure plate, so that there is no longer any transmission of drive to the disk 7. The lugs 19 project rearwardly from the pressure plate 9, parallel to the axis of rotation of the clutch, and have flat side faces 20 and 21 substantially parallel to one another and to radii of the pressure plate, which, in the unimproved clutch slidably engage the opposite sides of slots or openings provided in the rear wall 22 of the back plate to transmit drive from the flywheel through the back plate and pressure plate to the disk 7. It is at these points that the hammer noise is produced which the anti-rattle means of our invention, indicated generally by the reference numeral 23, is designed to eliminate, as will soon appear, the hammer noise being produced as a result of the working clearance necessarily provided in the back plate slots or openings for the drive lugs.

The lugs 19 have set screws 24 threaded in longitudinal holes 25 provided therein, and when the heads of the screws 24 are properly adjusted relative to the outer ends 16 of the levers 12, lock nuts 26 on the shanks of the screws 24 are tightened against the rear ends of the lugs 19 to lock the screws in adjusted position. In taking up for wear on the facings 10, the screws 24 are backed up a turn or so after the lock nuts 26 are loosened, and when the correct relationship of the clutch parts has been reproduced in that way, the screws 24 are locked in adjusted position by tightening the nuts 26. These nuts serve to clamp the springs 18 by their middle U-shaped attaching portions 27, which straddle the screws 24. The legs 28 of the hairpin springs 18 normally extend at an angle of approximately 45° with respect to one another, but are forced toward one another between the parallel rearwardly bent flanges 29 on the back plate, so that each spring 18 affords a lateral component, due to the tendency of the legs 28 to spread apart, and a forward component, due to the extent of compression of the spring in its assembled position in the clutch. The lateral component, resulting from the crowding of the legs 28 between the flanges 29, tends to keep the associated lug 19 centralized with respect to its slot or opening 30 in the back plate when the clutch is released, thus minimizing the tendency toward rattling. The forward component, due to the rearward deflection of the legs 28 when the pressure plate 9 is moved forward under spring action of the levers 12 in the engagement of the clutch, asserts itself when the clutch is released and causes the pressure plate 9 to be backed away from the flywheel and clutch disk as the outer ends 16 of the levers 12 are retracted relative to the screws 24.

The small concavo-convex spring washers, indicated at 31, constitute a resilient cushioning means between the pressure plate 9 and the release levers 12, which, as disclosed in Thelander Patent 2,214,780, enable the elimination of the "mush" effect in the clutch disk while still obtaining the desired gradual engagement of the clutch, the bosses 32 provided on the heads of the screws 24 and entered in center holes in these spring washers serving to mount the washers on the screws and to take the direct positive thrust of the levers 12 at full engagement of the clutch, after the washers 31 have been compressed during initial engagement. The outer ends 16 of the levers 12 are wide enough to engage the rim portions of the washers 31 at diametrically opposed points.

The anti-rattle means 23 of our present invention consists of wedge blocks 33, which may be made in the form of die castings for cheapness, which are slidably mounted in the drive lug slots or openings 30 provided in the back plate, there being one of these flying wedges associated with each drive lug on the "coast" side 21, between the drive lug and the adjacent edge 34 of the opening. The edge 34 is in outwardly converging relation relative to the "coast" side 21 of the drive lug, speaking with reference to the axis of rotation of the clutch, the angle of convergence being equal to the angle of taper of the wedge 33, so that the wedge has uniform surface engagement substantially its full length on the face 21 and edge 34 when disposed in the operative position illustrated in Fig. 2. Flanges 35 extending the full length of the wedge 33 have slidable engagement on the inner and outer sides of the back wall 22 of the back plate, to prevent lateral displacement of the wedge from the opening 30 while permitting freedom of endwise movement of the wedge under centrifugal force. A coiled compression spring 36 cooperates with each wedge to urge the same normally inwardly toward the axis of rotation of the clutch to a retracted position in engagement with the inner edge 37 of the opening 30, as indicated by the dotted line position of the wedge shown in Fig. 2. The spring 36 fits in a recess 38 in the small end of the wedge and is compressed between the small end of the wedge and the outer edge 39 of the opening 30.

In operation, the flying wedges 33 are normally disposed in a retracted position in abutment with the inner edges 37 of the openings 30, being held in that position under pressure of the springs 36 against centrifugal force acting on the wedges in the rotation of the flywheel. So long as the wedges are in a retracted position, ample working clearance is left for the drive lugs 19 in the openings 30, and, consequently, there is nothing to interfere with the easy endwise movement of the drive lugs in said openings for engagement and disengagement of the clutch. However, when the flywheel attains a predetermined speed of say 2000 R. P. M., the centrifugal force is sufficient to cause the wedges 33 to move outwardly against the action of the springs 36, so as to take up all clearance on the "coast" side 21 of the drive lugs and accordingly keep the drive lugs in fixed engagement on their "drive" side 20 with the adjacent edges 40 of the openings 30 in the back plate, whereby positively to eliminate any rattling noise. Conversely, when the flywheel speed drops to a predetermined point, where the centrifugal force is less than the pressure of the springs 36, the wedges 33 are automatically retracted, thus allowing ample clearance again for freedom of movement of the drive lugs 19 in the openings 30. It is, therefore, only during idling and at low engine speeds, below the critical speed of say 2000 R. P. M., that the wedges 33 are retracted and the driving lugs 19 operate with ample working clearance in the openings 30, but at such times the springs 18 can be relied upon to minimize, if not entirely eliminate, rattling. While we prefer to employ the springs 36, it should be understood that they are not absolutely essential and may be dispensed with if desired.

It is believed the foregoing description conveys a good understanding of the objects and advantages of our invention. The appended claims have been drawn to cover all legitimate modifications and adaptations.

We claim:

1. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a takeup element movable relative to said projection in the aforesaid opening positively to take up operating clearance between said projection and opening.

2. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a takeup element movable under centrifugal force relative to said projection in the aforesaid opening positively to take up operating clearance between said projection and opening, and spring means normally tending to move said takeup element to retracted position in which said projection has a predetermined operating clearance in said opening.

3. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, spring means for normally centralizing the projection in the opening, and a takeup element movable relative to said projection in the aforesaid opening positively to take up operating clearance between said projection and opening.

4. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, spring means for normally centralizing the projection in the opening, a takeup element movable under centrifugal force relative to said projection in the aforesaid opening positively to take up operating clearance between said projection and opening, and spring means normally tending to move said takeup element to retracted position in which said projection has a predetermined operating clearance in said opening.

5. In a clutch comprising a driving element and a driven element, a pressure plate for holding the driving and driven elements frictionally engaged, a lever support mounted on the driving element, a lever thereon arranged to communicate movement to the pressure plate under spring pressure to cause engagement of the clutch, spring means active against the lever to apply clutch engaging pressure to the pressure plate, said pressure plate having a projection extending rearwardly through an opening provided therefor in the lever support toward the lever for operation of the pressure plate by the lever and to provide a driving connection between the pressure plate and said support, one end of said lever being disposed in operative relation to said projection and the other end of said lever being manually operable to release the clutch, and a takeup element movable relative to said projection in the aforesaid opening positively to take up operating clearance between the projection and opening.

6. In a clutch comprising a driving element and a driven element, a pressure plate for holding the driving and driven elements frictionally engaged, a lever support mounted on the driving element, a lever thereon arranged to communicate movement to the pressure plate under spring pressure to cause engagement of the clutch, spring means active against the lever to apply clutch engaging pressure to the pressure plate, said pressure plate having a projection extending rearwardly through an opening provided therefor in the lever support toward the lever for operation of the pressure plate by the lever and to provide a driving connection between the pressure plate and said support, one end of said lever being disposed in operative relation to said projection and the other end of said lever being manually operable to release the clutch, a takeup element movable under centrifugal force relative to said projection in the aforesaid opening positively to take up operating clearance between the projection and opening, and spring means normally tending to move said takeup element to a retracted position in which said projection has a predetermined operating clearance in said opening.

7. In a clutch comprising a driving element and a driven element, a pressure plate for holding the driving and driven elements frictionally engaged, a lever support mounted on the driving element, a lever thereon arranged to communicate movement to the pressure plate under spring pressure to cause engagement of the clutch, spring means active against the lever to apply clutch engaging pressure to the pressure plate, said pressure plate having a projection extending rearwardly through an opening provided therefor in the lever support toward the lever for operation of the pressure plate by the lever and to provide a driving connection between the pressure plate and said support, one end of said lever being disposed in operative relation to said projection and the other end of said lever being manually operable to release the clutch, spring means for normally centralizing the aforesaid projection in the aforesaid opening, and a takeup element movable relative to said projection in the aforesaid opening to take up operating clearance between the projection and opening.

8. In a clutch comprising a driving element and a driven element, a pressure plate for holding the driving and driven elements frictionally engaged, a lever support mounted on the driving element, a lever thereon arranged to communicate movement to the pressure plate under spring pressure to cause engagement of the clutch, spring means active against the lever to apply clutch engaging pressure to the pressure plate, said pressure plate having a projection extending rearwardly through an opening provided therefor in the lever support toward the lever for operation of the pressure plate by the lever and to provide a driving connection between the pressure plate and said support, one end of said lever being disposed in operative relation to said projection and the other end of said lever being manually operable to release the clutch, spring means for normally centralizing the aforesaid projection in the aforesaid opening, a takeup element movable under centrifugal force relative to said projection in the aforesaid opening to take up operating clearance between the projection and opening, and spring means normally tending to move said takeup element to a retracted position in which said projection has a predetermined operating clearance in said opening.

9. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, said lever supporting means providing laterally spaced supporting walls on opposite sides of each of said drive lugs, a release lever pivotally supported near its outer end between said walls adjacent each of said lugs with the outer end disposed in operative relation to the lug to transmit pressure to the pressure plate, springs supported on said lever supporting means and engaging said levers between the pivots therefor and their inner ends, said levers being operable manually at their inner ends to release spring pressure from the pressure plate, springs means cooperating with the aforesaid projection and the aforesaid supporting walls on the lever supporting means to centralize the projection in the aforesaid opening, and a takeup element movable relative to said projection in the aforesaid opening to take up operating clearance between the projection and opening.

10. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, said lever supporting means providing laterally spaced supporting walls on opposite sides of each of said drive lugs, a release lever pivotally supported near its outer end between said walls adjacent each of said lugs with the outer end disposed in operative relation to the lug to transmit pressure to the pressure plate, springs supported on said lever supporting means and engaging said levers between the pivots therefor and their inner ends, said levers being operable manually at their inner ends to release spring pressure from the pressure plate, spring means cooperating with the aforesaid projection and the aforesaid supporting walls on the lever supporting means to centralize the projection in the aforesaid opening, a takeup element movable under centrifugal force relative to said projection in the aforesaid opening to take up operating clearance between the projection and opening, and spring means normally tending to move said takeup element to a retracted position in which said projection has a predetermined operating clearance in said opening.

11. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a wedge movable relative to the coast side of said projection in the aforesaid opening to take up operating clearance between said projection and opening.

12. In a friction clutch comprising driving and driven elements, a back plate turning with the driving element, and a pressure plate for holding said driving and driven elements drivingly engaged and having one or more drive projections thereon normally freely movable in one or more openings provided therefore in the back plate, a wedge movable under centrifugal force relative to the coast side of said projection in the aforesaid opening to take up operating clearance between said projection and opening, and spring means normally tending to move said wedge to retracted position in which said projection has a predetermined operating clearance in said opening.

13. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, spring means for normally centralizing the projection in the opening, and a wedge movable relative to the coast side of said projection in the aforesaid opening to take up operating clearance between said projection and opening.

14. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, spring means for normally centralizing the projection in the opening, a wedge movable under centrifugal force relative to the coast side of said projection in the aforesaid opening to take up operating clearance between said projection and opening, and spring means normally tending to move said wedge to retracted position in which said projection has a predetermined operating clearance in said opening.

15. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a wedge of channel-shaped cross-section slidably guided by engagement of one edge portion of the opening in the channel of the wedge for movement relative to one of the coast and drive sides of said projection to take up operating clearance between said projection and opening.

16. A clutch structure as set forth in claim 15, wherein said wedge is arranged to move toward takeup position under centrifugal force, said structure including spring means for returning the wedge to retracted position.

17. In a friction clutch comprising a back plate, and a pressure plate having a drive lug projecting therefrom freely through an opening provided in the back plate, a wedge for application to the edge portion of the back plate in said opening on one of the coast and drive sides of said drive lug, said wedge being of elongated form and channel-shaped in cross-section to accommodate in the channel thereof that portion of the back plate next to the opening as a guide and support for the wedge, the length of said wedge being less than the length of the edge portion on which said wedge operates, and the channel therein being of a width slightly greater than the thickness of said edge portion.

18. In a friction clutch comprising a back plate, and a pressure plate having a drive lug projecting therefrom freely through an opening provided in the back plate, a wedge for application to the edge portion of the back plate in said opening on one of the coast and drive sides of said drive lug, said wedge being of elongated form and channel-shaped in cross-section to accommodate in the channel thereof that portion of the back plate next to the opening as a guide and support for the wedge, the length of said wedge being less than the length of the edge portion on which said wedge operates, and the channel therein being of a width slightly greater than the thickness of said edge portion, said wedge being cast substantially to the form described.

19. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a single spring means cooperating with the projection for normally centralizing the projection in the opening and urging the pressure plate to retracted position, and a takeup element movable relative to said projection in the aforesaid opening positively to take up operating clearance between said projection and opening.

20. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a single spring means cooperating with the projection for normally centralizing the projection in the opening and urging the pressure plate to retracted position, a takeup element movable under centrifugal force relative to said projection in the aforesaid opening positively to take up operating clearance between said projection and opening, and spring means normally tending to move said takeup element to retracted position in which said projection has a predetermined operating clearance in said opening.

21. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a single spring means cooperating with the projection for normally centralizing the projection in the opening and urging the pressure plate to retracted position, and a wedge movable relative to the coast side of said projection in the aforesaid opening to take up operating clearance between said projection and opening.

22. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a single spring means cooperating with the projection for normally centralizing the projection in the opening and urging the pressure plate to retracted position, a wedge movable under centrifugal force relative to the coast side of said projection in the aforesaid opening to take up operating clearance between said projection and opening, and spring means normally tending to move said wedge to retracted position in which said projection has a predetermined operating clearance in said opening.

23. In a friction clutch comprising driving and driven elements, a back plate turning with the driving element, and a pressure plate for holding said driving and driven elements drivingly engaged and having one or more drive projections thereon normally freely movable in one or more openings provided therefor in the back plate, a single spring means cooperating with the projection for normally centralizing the projection in the opening and urging the pressure plate to retracted position, a wedge of channel-shaped cross-section slidably guided by engagement of one edge portion of the opening in the channel of the wedge for movement relative to one of the coast and drive sides of said projection to take up operating clearance between said projection and opening.

24. A clutch structure as set forth in claim 23, wherein said wedge is arranged to move toward takeup position under centrifugal force, said structure including spring means for returning the wedge to retracted position.

W. VINCENT THELANDER.
EVERSON M. DE COURSEY.

REFERENCES CITED

The following references are of record in the file of this patent:

UNITED STATES PATENTS

| Number | Name | Date |
|---|---|---|
| 1,639,379 | La Londe | Aug. 16, 1927 |
| 2,214,780 | Thelander | Sept. 17, 1940 |